United States Patent Office 3,374,410
Patented Mar. 19, 1968

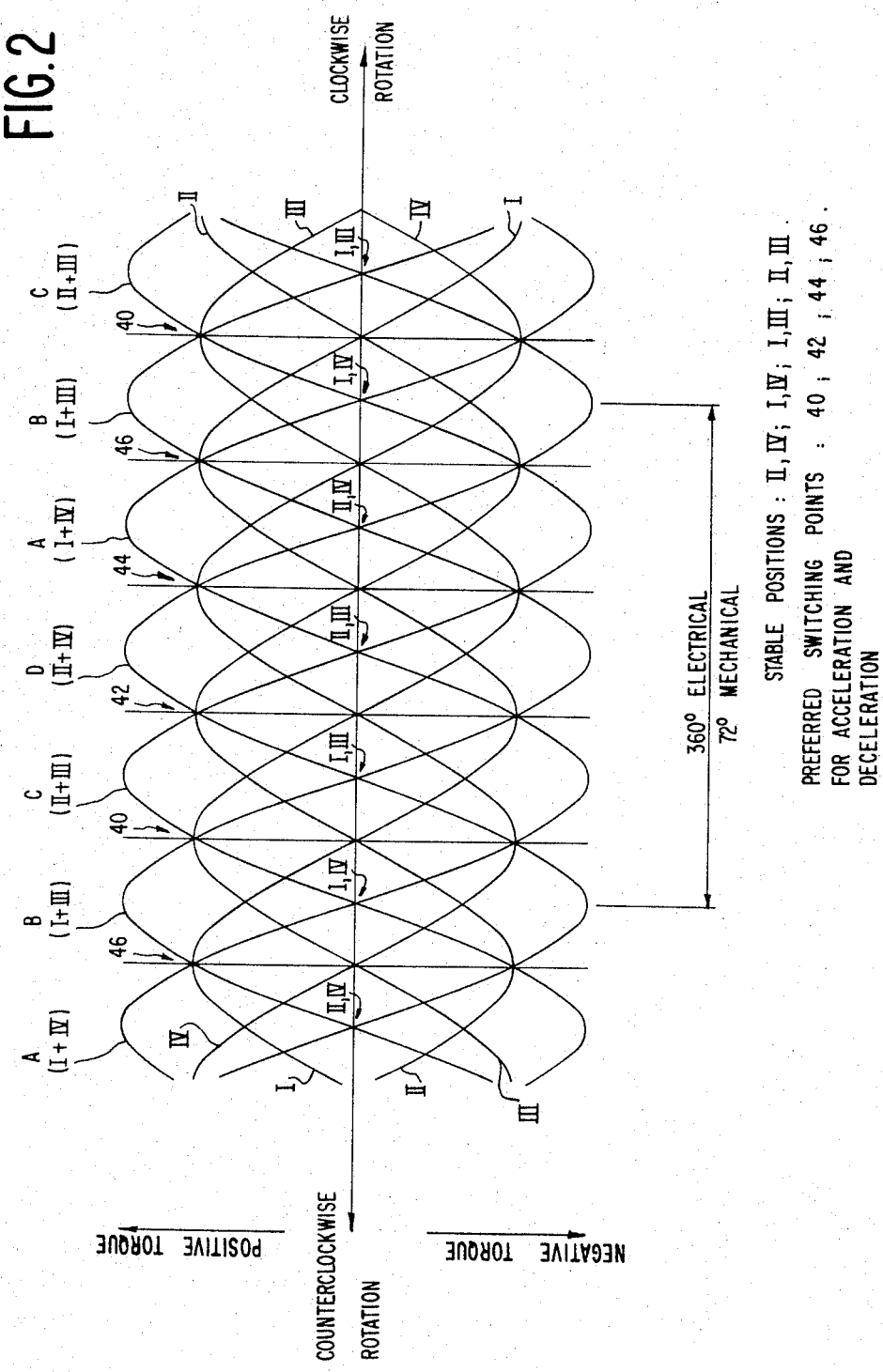

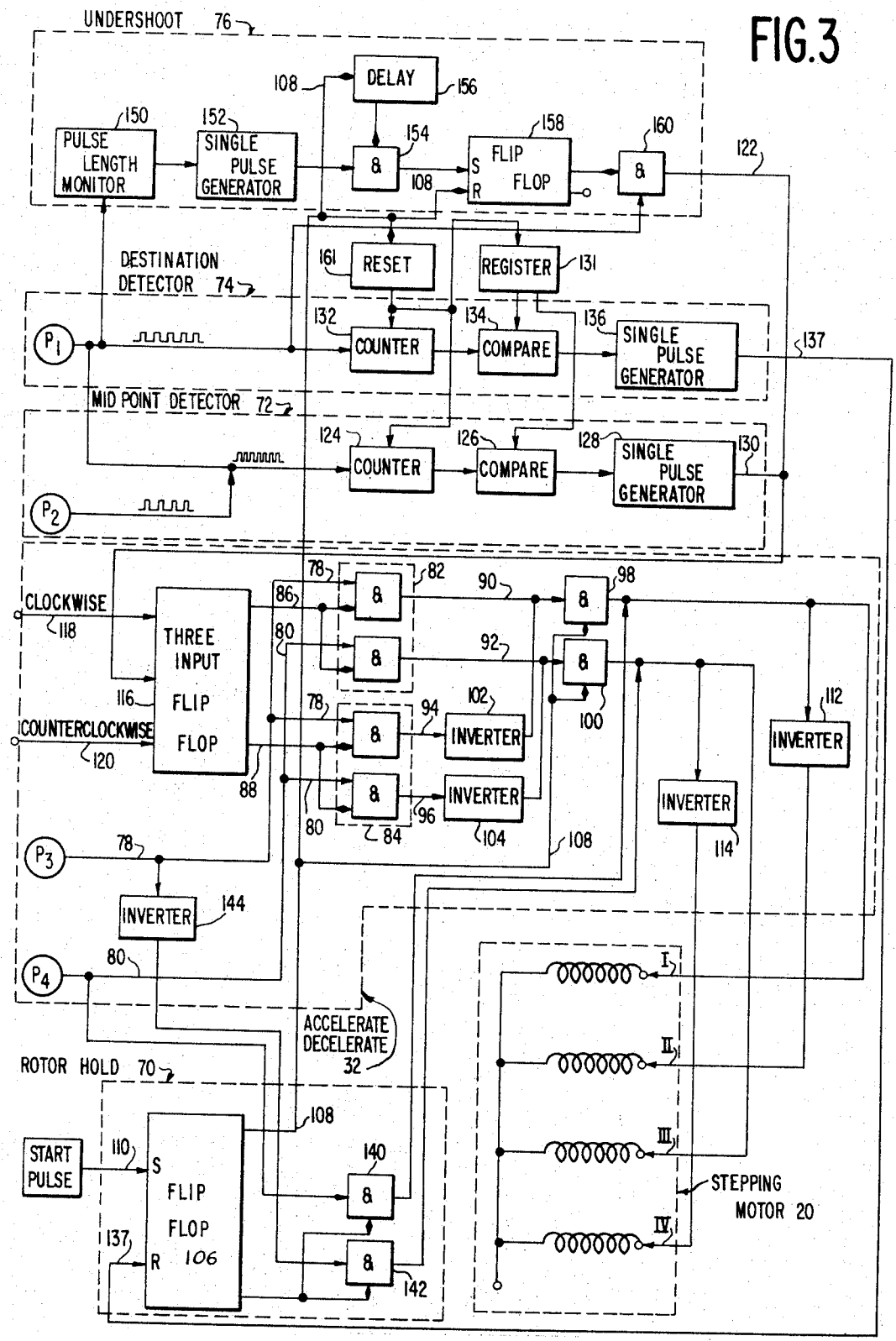

3,374,410
STEPPING MOTOR POSITIONING SYSTEM INCLUDING ACCELERATION AND DECELERATION CONTROL
Donald H. Cronquist and Joseph E. Shepard, Los Gatos, Calif., assignors to International Business Machines Corporation, New York, N.Y., a corporation of New York
Filed Jan. 6, 1965, Ser. No. 423,671
7 Claims. (Cl. 318—138)

ABSTRACT OF THE DISCLOSURE

A self-regulating, high speed stepping motor where internally generated pulses, the repetition rate and duration of which are a function of the location and velocity of the rotor, are amplified and applied to the windings so as to achieve essentially linear acceleration during a first fraction of the total distance and essentially linear deceleration during a second fraction of the total distance to be stepped.

---

This invention relates to stepping motors; more particularly, the invention relates to a self-regulating stepping motor capable of stepping at extremely high rates.

As those skilled in the art will appreciate, stepping motors differ from conventional motors mostly in the general type of their motion. Most motors are normally provided to continuously move some load in a fashion which requires essentially few, or small changes of velocity once the operating velocity is reached. Stepping motors, on the other hand, are used to discretely position loads and their motion is characterized by frequently changing sequences of acceleration and deceleration. For example, those applications which dictate the frequent repositioning of a mechanical member to successively different positions are ideally adapted for the use of a stepping motor. The general mode of operation of such stepping motors calls for the provision of a series of shaped stepping pulses to the motor, one pulse per step, each of which subjects the motor to an energy impulse to drive it a discrete distance or step. The successive applications of a series of such pulses causes the motor to successively step through a series of incremental motions until the destination of the member to be mechanically positioned by such movement has been reached.

To date the prior art stepping motors have utilized pulse sources which are external to the stepping motor itself. By the term external pulse source is meant a pulse source which generates pulses independently, both as to timing and duration, of the existing torque requirements of the motor. It has often been the practice that the width and repetition rate of pulses supplied to a stepping motor throughout a given incrementing operation remain constant. The problem with utilizing pulses of constant width and repetition rate is that the torque requirements of the motor, which vary with the rotor velocity, are totally ignored.

As those skilled in the art will appreciate, the pulse width required to produce a single step varies depending on the particular velocity of the rotor at the time the pulse is applied. If the rotor is at rest, a longer pulse is required to advance the rotor to the next step than if the rotor is rotating with some given velocity. As will further be appreciated by those skilled in the art, if a rotor is accelerating the pulses required to advance the rotor to successive positions will successively become shorter in duration as well as closer together. Additionally, as the velocity of the rotor increases the timing of the pulses for maximum torque, i.e., the application to the stator windings of pulses of proper phase, becomes increasingly more difficult and critical. Hence, it becomes clear that the prior art practice of utilizing pulse trains, which have pulses of constant width and repetition rate, for positioning a rotor inherently is unable to efficiently use the energy input to the stator windings. The pulses are just not "matched" to the particular rotor velocity, i.e., the pulses applied to the stator windings are, in addition to not being properly phased, not of the proper length. The use of externally generated pulses to step a rotor successively through a particular number of steps produces a rotor motion pattern characterized by periods of acceleration and deceleration for each step. This periodic deceleration at the end of each step prevents the rotor from ever achieving a high velocity as it moves through many steps to its destination. Consequently, the time required for each step is not optimized. The problem with failing to provide pulses to successively increment the rotor that are individually matched to the rotor velocity is that high stepping rates are not obtainable.

Accordingly, it is a prime objective of this invention to provide a new and improved stepping motor which obviates the above-mentioned shortcomings of the prior art.

It is another object of this invention to provide a stepping motor capable of extremely high stepping rates.

It is a further object of this invention to provide a stepping motor which utilizes maximum available torque in advancing the rotor.

It is yet another object of this invention to provide a stepping motor in which the pulses supplied thereto are not generated by an external source.

It is still another object of this invention to provide a stepping motor in which the pulses supplied thereto are a function of the then existing speed of the motor.

It is yet a further object of this invention to produce a stepping motor which accomplishes all of the above-noted objects and yet is still adaptable for use in applications in which prior art motors are presently being used.

According to one aspect of the invention, undesirable changes in the velocity of a stepping motor due to improperly timed and improperly shaped pulses are eliminated by providing pulse generating means which, from the rotation of the motor itself, generate a train of pulses whose duration and spacing continuously change with the changing speed of the motor. Because the pulses in any given pulse train, which are to be supplied to the motor to control the incremental motion thereof, are at all times of such a duration and occur at such a repetition rate as to be ideally phased relative to the then existing speed of the motor, the motor is subjected to a single period of nearly linear acceleration during the first half of its motion and a single period of nearly linear deceleration during the last half of its motion.

Means are provided to amplify the self-generated pulses and thereafter they are applied to the windings of the stepping motor. Whether the motor will, in any particular instance, be accelerating or decelerating in response to a pulse is determined by control means interposed between the pulse generating means and the motor windings which control the application of pulses to the windings of the motor. For example, those instances in which acceleration is the desired mode of operation, pulses would be supplied to the windings of the motor in an "aiding" phase relationship; in those instances, in which it is desired to decelerate the motor, the pulses would be applied to the windings of the motor in an "opposing" phase relationship.

According to another aspect of the invention, pulse generating means are provided for generating stepping pulses, the duration and timing of each pulse being functions of the then existing rotor speed. To regulate the application of the stepping pulses to the stepping motor windings, a control circuit is provided which detects when the midpoint of the desired travel has been reached. In response to such a detection, the control circuit changes the mode of application of the pulses to the windings from an acceleration mode to a deceleration mode thereby bringing the rotor to a stop at the end point of the desired travel, i.e., at the destination. Thus, the rotor accelerates during the first one-half of the desired travel and decelerates during the last one-half. In addition, the control circuit senses when the rotor achieves zero velocity, which occurs at the end point of desired travel, and in response thereto changes the energization of the windings from a deceleration mode to a holding-restoring torque mode wherein the rotor neither tends to accelerate or decelerate, but to remain stationary.

According to a still further aspect of this invention, pulse generating means are provided for generating stepping pulses, the duration and timing of each pulse being functions of the then existing rotor speed. To regulate the application of the stepping pulses to the stepping motor windings, a control circuit is provided which detects when the midpoint of the desired travel has been reached. In response to such a detection, the control circuit changes the mode of application of the pulses to the windings from an acceleration mode to the deceleration mode to thereby slow down the rotor. To avoid premature stopping of the rotor prior to reaching the destination undershoot means are included in the control circuit. This means detects when the rotor is approaching zero velocity and in response thereto, advances the rotor to the destination by applying the pulses to the windings in such a manner as to alternately produce steps of rotor acceleration and deceleration. When the rotor reaches its destination, a destination detector, also part of the control circuit, detects this condition and energizes the windings in a restoring-holding torque mode to maintain the rotor at rest at the destination.

It has been found that application of the principles of the invention to a conventional stepping motor, whose previous maximum stepping rate was limited to approximately 300 steps per second, resulted in an increase of the stepping rate to approximately 19,200 steps per second. This is a substantial increase in operating speeds and is one of the principal advantageous features of the invention.

The foregoing and other objects, features and advantages of the invention will be apparent from the following more particular description of a preferred embodiment of the invention, as illustrated in the accompanying drawings.

In the drawings wherein like numerals represent like elements:

FIG. 2 depicts a torque diagram for the motor shown schematically in FIG. 1. With this figure, which indicates the approximate torque produced under different conditions of stator winding energization, it is possible to predict the direction of rotation of the shaft under various winding energization conditions.

FIG. 3 depicts a control circuit useful in conjunction with the stepping motor of FIG. 1 for controlling the energization of the stator windings.

Structure

Figure 1:
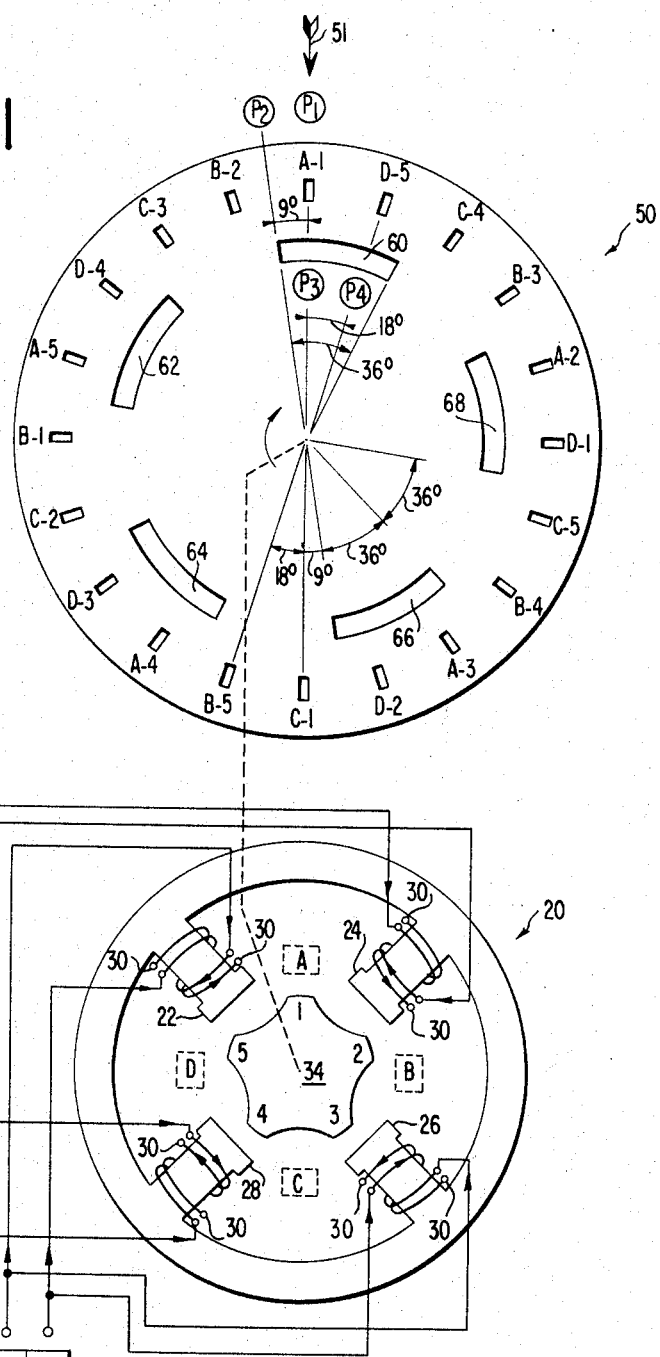
FIG. 1 depicts schematically a stepping motor suitable for use in this invention which has an apertured disc mounted on the rotor shaft thereof. The figure illustrates the relationship to each other of the rotor, stator windings, effective pole positions, apertured disc, and photosensitive devices.

*Motor.*—Referring to FIG. 1 a preferred stepping motor useful in implementing the principles of this invention is schematically depicted. The motor, which is generally indicated by the numeral 20, comprises four equally spaced stator poles 22, 24, 26, 28. Cooperating with the stator poles 22, 24, 26, 28 are four windings I, II, III, IV which are wound in bifilar fashion as indicated in the figure. The ends 30, for clarity shown unconnected in the drawing, are collectively connected to a center tap (not shown) which is connected to a power supply (not shown) in a manner well known in the art. The other ends of the windings I–IV are connected to the accelerate-decelerate section of the control circuit shown in FIG. 3, the accelerate-decelerate section being generally indicated by the numeral 32. Again referring to FIG. 1, particularly to the windings I–IV, it will be observed that arrows are provided indicating the direction of current flow in the windings. Whenever the windings are energized for any purpose, whether it be to produce clockwise rotation, counterclockwise rotation, or to maintain the rotor at rest, the windings are energized such that current flows only in the directions indicated.

In addition, the windings I–IV are energized in pairs, i.e., at any one instant current is flowing in the directions shown in only two of the four windings. Depending on which pair of windings is energized, the location of the effective, assumed north pole of the stator can be at any one of four positions indicated by the letters A, B, C, D. For example, it will be observed that if windings I and IV are energized causing current to flow in the direction of the arrows, flux flows from stator 28 to stator 24 and from stator 26 to stator 22, respectively. The net effect is that an effective north pole is produced at a point between stator 22 and stator 24 as indicated by the dotted-line square enclosing the letter A. Similarly, if current is caused to flow in the windings I and III, an effective north pole is produced between stators 24 and 26 as indicated by the dotted-line square enclosing the letter B. In a like manner, energization of windings II and III and windings II and IV produce effective north poles at C and D, respectively.

To provide a simple aid in determining the effective pole location for different conditions of winding energization, a table is provided in FIG. 1 correlating the effective poles and the energized windings. Referring to this table, it will be observed that the left most vertical column contains the letters A, B, C and D corresponding to the effective north poles. The top horizontal row contains the Roman numeral designations of the four windings I, II, III and IV. The "+" and "0" designations reflect the state of energization of the winding heading the vertical row in which the "+" or "0" appears. A "+" indicates energization; a "0" indicates no energization. For example, looking at the table, it will be observed that an effective north pole is produced at A when windings I and IV are energized, an effective north pole at B when windings I and III are energized, etc.

Referring again to FIG. 1, a rotor 34 is shown. The rotor, which acts as a south pole, has five distinct poles 1, 2, 3, 4 and 5 equally spaced about the rotor periphery. In actual practice only one end of the rotor is a south pole, the other end being a north pole. Also, in actual practice the poles of the rotor at the north end are angularly displaced by an amount equal to 36°. Thus, the north rotor poles are angularly positioned between the south rotor poles. Referring to FIG. 1, this means that when south rotor pole 1 is aligned with effective north stator pole A, a north rotor pole (not shown) at the other end of the rotor would be aligned with effective south stator pole C. This type of arrangement is well known in the art. For example, Superior Electric Co. of Bristol, Conn., markets such a motor under the trade name Slo-Syn Motor. The rotor is mounted for rotation in both a clockwise and counterclockwise sense. However, before describing the particular manner in which clockwise and counterclockwise rotations are produced, the method used for maintaining the rotor at rest will be briefly described. Assume the rotor is at rest in the position shown in FIG. 1. It will be observed that rotor pole 1 is the only rotor pole directly opposite one of the four locations where an effective north pole can be produced by one of the four stator winding energization conditions described earlier. Thus, assuming the rotor pole 1 to be a south pole, the rotor can be maintained at rest in the position shown if an effective north pole is produced at A. From the chart appearing in FIG. 1, it is noted that such a condition can be produced by energizing windings I and IV. It is to be noted that if the rotor is rotated to either side of the effective pole A, it will be returned to the stable position by a restoring-holding torque produced by the attraction between the effective north pole A and the rotor pole 1.

Referring to the FIG. 2 wherein a plot of torque versus rotor position appears, it will be seen that with the rotor in the position shown in FIG. 1 and an effective north pole at A, the rotor is stabilized. Before further discussing this condition of stability, the plot itself will be described. There are eight sinusoidal waveforms plotted. The waveforms labeled I, II, III, IV depict the torque on the rotor as a function of rotor position, which is produced by energization of windings I, II, III, IV, respectively. Positive torque tending to rotate clockwise is plotted above the horizontal axis, and negative torque tending to produce counterclockwise motion is plotted below the horizontal axis. The horizontal axis, of course, represents zero torque. The other four torque curves $(I+IV)$, $(II+III)$, $(II+IV)$, and $(I+IV)$, depict the torque resulting when windings I and IV, II and III, II and IV, and I and IV, respectively, are energized. Associated with each of these latter four torque curves is the letter designation of the effective pole location for that particular energization condition. For example, when windings I and IV are energized, torque curve $(I+IV)$ results and the effective pole is indicated as being at location A of the motor. Also to be noted is that clockwise rotation is indicated by movement to the right along the horizontal axis and counterclockwise rotation is indicated by movement to the left along the horizontal axis.

Returning again to the case wherein the rotor pole 1 is positioned as shown in FIG. 1, it will be remembered that windings I and IV are energized producing an effective pole at A. Now, referring to FIG. 2, in particular to curves I and IV, it will be seen that the positive torque produced by winding IV (see curve IV) just cancels the negative torque produced by winding I (see curve I) at two distinct points, namely, I, IV and II, III. Hence, the net torque is zero, which is a condition that must exist if the rotor is to remain stationary, at two different points within 360 electrical degrees. Referring to the curve $(I+IV)$ it will be seen that it has zero value at the position I, IV along the horizontal axis as well as at position II, III. However, it will be observed that only one of these positions of zero torque is stable, namely, position I, IV. Looking at curve $(I+IV)$ at the point I, IV it will be seen that for rotations of the rotor clockwise, i.e., to the right on this plot, there is a negative restoring-holding torque created which tends to rotate the rotor counterclockwise, i.e., to the left on the plot, thereby restoring the rotor to the zero torque position I, IV. Conversely, rotation counterclockwise, i.e., to the left, creates a positive restoring-holding torque tending to rotate the rotor clockwise returning it to the zero torque position I, IV. The other zero torque position for curve $(I+IV)$, located at point II, III, is unstable. At point II, III clockwise rotation of the shaft, i.e., to the right, creates a positive torque that tends to advance the shaft further to the right. Conversely, clockwise rotation of the shaft causes further clockwise rotation. Thus, it is seen that for energization of windings I and IV, only one stable position of shaft rotation exists. Similarly, for each of the other three conditions of winding energization only one stable condition exists. Specifically, points II, IV; I, III; and II, III are stable for energization of windings II and IV; I and III; and II and III, respectively.

The rotor can be held in any one of twenty different stable positions, including the one depicted in FIG. 1, by merely producing an effective north pole at one of the four possible locations A, B, C, D. The reason for having twenty stable positions with the stator-rotor arrangement shown will become apparent hereinafter.

Having discussed the manner in which the rotor is maintained in a desired position, the description will now focus on the manner in which clockwise and counterclockwise rotation is achieved. For the sake of clarity in describing the general mode of producing rotor rotation it will be assumed that different pairs of the windings are energized and de-energized only when a rotor pole is *directly* aligned with an effective stator pole. While this type of switching does not utilize the maximum available torque for reasons to become evident hereinafter, it does, it is felt, simplify the discussion of the operation of the motor 20. Now referring to FIG. 1 and assuming the rotor is at rest in the position shown, it will become clear that clockwise rotation can only be produced by producing an effective north pole at position B. An effective north pole at position B attracts rotor pole 2 moving the rotor clockwise until it is directly aligned with the effective pole B. Again referring to FIG. 1, it will be observed that a north pole at D will attract rotor pole 5 rotating it counterclockwise, while a north pole at C will theoretically have no effect on rotor position since rotor poles 4 and 3 are equidistant from the effective pole C and thus attracted equally to pole C producing no motion. Of course, an effective pole at C is unstable, therefore, slight movement of the rotor 34 or misalignment of rotor pole 1 with effective pole A, will result in rotation of the rotor in a direction depending on the movement or misalignment. Returning again to the case where an effective pole is produced at B, it was noted that the rotor pole 2 moved into alignment with effective pole B. Since there are five rotor poles and four stator poles, the geometry of the arrangement dictates that the changing from alignment of effective pole A with rotor pole 1 to alignment of effective pole B with rotor pole 2 involves a rotation of the rotor 18° in a clockwise direction. Now, if at the instant rotor pole 2 is aligned with effective pole B, the position of the effective pole is switched to position C by energization of windings II and III, rotor pole 3 will be attracted toward effective pole C producing an additional rotation of 18° in a clockwise direction. In a like manner, energization of windings II and IV creating an effective north pole at D will attract rotor pole 4 producing an additional 18° clockwise rotor movement. If next, an effective north pole is produced at location A, rotor pole 5 will be moved into alignment with pole A producing another 18° of rotation. Thus, it is seen that successive energization of the windings to produce effective north poles at B, C, and D, etc., will produce continuous clockwise motion of the rotor.

Referring briefly to FIG. 2, the above-described stepping motion will be discussed utilizing the torque plot. As assumed in the example the rotor pole 1 is at rest in the position shown in FIG. 1. Windings I and IV are energized creating an effective north pole at location A. On the torque plot this corresponds to position I, IV where the curve $(I+IV)$ crosses the horizontal axis with a negative slope. Clockwise motion can be produced only by a positive torque. Hence, looking at the plot, it is seen that at point I, IV, a positive torque will be produced only if windings I and III are energized since curve $(I+III)$ exhibits a positive torque at this point. From FIG. 1, it is seen that energization of windings $I+III$ produces an effective pole at B. Thus, agreement between the torque plot and the results derived previously is found to exist. It will be observed that at point I, IV energization of no other winding can insure clockwise motion. Curve $(II+III)$ is zero at point I, IV and represents an unstable point since rotation of the rotor in either direction will cause continued rotation in that direction. Curve $(II+IV)$ is negative and, therefore, produces counterclockwise rotation.

Now, assuming that windings I and III are energized when the rotor is positioned as shown in FIG. 1, the rotor will accelerate clockwise since torque curve (I+III) is positive at point I, IV and continue to accelerate until point I, III is reached, a stable position, where the torque becomes zero. This position I, III corresponds to alignment stator pole 2 with effective pole B. If at point I, III windings II and III are energized, producing an effective pole at location C, the rotor will rotate to stable position II, III under the action of torque curve (II+III). This corresponds to alignment of rotor pole 3 with effective pole C. Further rotation is achieved by energizing windings II and IV producing an effective pole at D which rotates the rotor clockwise to point II, IV aligning rotor pole 4 with effective pole D, a stable position. Producing an effective pole at A by energizing windings I and IV rotates the rotor clockwise to point I, IV aligning rotor pole 5 with effective pole A, a stable position. Thus, it is seen using the torque plot of FIG. 3 that is is possible, by successively energizing different pairs of windings, to advance the rotor from a position where rotor pole 1 is aligned with effective pole A to a position where rotor pole 5 is aligned with pole A. Of course, the incrementing need not stop with rotor pole 1 aligned with effective pole A. Further rotation is possible by the continued production of effective poles moving in a clockwise sense. Specifically, by successively producing poles at B, C, D, A, B, C, D . . ., in this order, continuous clockwise motion is obtained.

Referring again to FIG. 2, it will be observed that as the rotor rotated clockwise, it successively passed points 40, 42, 44 and 46 where curves (I+III) and (II+III), (II+III) and (II+IV), (II+IV) and (I+IV), and (I+IV) and (I+III), crossed paths, respectively. While the rotor, as already shown, would continue to rotate past points 40, 42, 44 and 46 under the action of torque curves (I+III), (II+III), (II+IV) and (I+IV), respectively, and align rotor poles 2, 3, 4 and 5 with effective poles B, C, D and A, respectively, it has been found more expedient in practice to switch the energization of the windings at the aforementioned points so as to produce a higher average torque. The description of the operation of the motor of FIG. 1, which has been presented in the preceding paragraphs, it will be remembered, assumed that switching did *not* occur at points 40, 42, 44 and 46, but instead occurred only when a rotor pole was directly aligned with an effective stator pole. It will further be remembered that this condition was imposed on the switching for the purpose of making the description of the general mode of operation of the motor as simple as possible. However, the description of the preferred embodiment from this point forward will be concerned with the case where switching occurs at points 40, 42, 44 and 46. The control circuit and pulse generating means hereinafter to be described will function to allow switching at these selected points so as to realize the greatest average torque possible. This does not change the general mode of operation of the motor 20, it just improves the phasing to utilize maximum available torque.

It is further observed that successively producing effective poles at the locations described in the above example, i.e., at B, C, D, A, while returning the effective stator pole to the position it occupied initially, does not return rotor pole 1 to the position it initially occupied. Instead rotor pole 1 has, by successive advances, moved into the position that rotor pole 2 initially occupied as a consequence of the successive production of effective poles at locations B, C, D and A. Stated differently, it requires four winding energizations to move the rotor pole 1 to the position initially occupied by rotor pole 2. Stated still differently, a sequence of winding energizations comprising the production of effective poles at B, C, D and A, which represents 360 electrical degrees, is required to advance the rotor 72 mechanical degrees. The reason why the above sequence of winding energizations, four in number, constitutes 360° becomes clear if it is realized that there are only four effective pole locations that can be produced with the arrangement shown. Thus, after the four possible winding energization conditions are produced, the energization pattern repeats itself and the same pairs of windings are successively energized again. Since the time between re-energization of a pair of windings is by convention 360°, it becomes clear that 360 electrical degrees is equivalent to 72 mechanical degrees.

Counterclockwise rotation of the rotor is obtained by reversing the sequence of energization. I.e., assuming the rotor to be at rest in the position shown in FIG. 1, counterclockwise rotation can be produced by sequentially, and at the proper time, energizing the windings so as to produce effective north poles at locations D, C, B, A, etc., instead of at locations B, C, D, A, etc.

Thus far the general mode of operation of the stepping motor 20 has been set forth. The preceding paragraphs, while indicating which windings are to be energized and in what sequence to produce clockwise and counterclockwise motion and while indicating the manner of achieving rotor position stability at rest, did not indicate the particular means by which the different conditions and sequences of winding energization are effected to produce these different results. The discussion will now set forth preferred means for accomplishing these results. But first a digression will be made so as to indicate the problems involved.

It will be remembered that the rotor could be advanced in either a clockwise or counterclockwise sense from the position shown in FIG. 1 by switching the energization of the windings at specific points. In the preferred embodiment it was stated that the optimum switching points for maximum utilization of available torque occur at points 40, 42, 44 and 46 depicted in the torque plot of FIG 2. Within limits it doesn't matter where the switching points occur. As described in the simplified example of the general mode of operation of the motor, rotation was achieved by taking the switching points to be at the stable points I, IV; I, III; II, III, and I, IV. This latter choice represents a less efficient use of available torque, but still produces rotation. In any event, the switching points occur at points *equally spaced* with respect to the rotor orientation. Stated differently, regardless of choice of switching point, whenever the rotor is rotating, a switching point occurs for every 18° of rotor rotation, which is equivalent to 90 electrical degrees. Thus, to step the rotor successively through, for example, 14 steps of 18° each, the winding energization will change once for each 18° of rotor movement giving a total of 14 changes. This total of 14 changes in winding energization does not include changes which occur in switching to and from the holding-restoring torque mode and switching which occurs at the midpoint or when the rotor stops prematurely. As will be appreciated by those skilled in the art, the time duration between switching points becomes increasingly shorter as the rotor accelerates. Assuming a 14 step increment is desired, when the rotor starts from rest the time required to rotate through the first step is much longer than that required for the fifth step since the rotor when it begins the fifth step has a finite velocity due to the fact that it has been accelerating for four steps. Thus, the need for means to energize the different windings for *different* periods of time while it moves to its destination is felt to be clear if high stepping rates are desirable.

Also, as those in the art will appreciate from the description that has so far been given, at some point in the course of travel the rotor must be decelerated so it will stop at the desired destination. Ideally, the point where acceleration switches to deceleration is the midpoint between the starting point and the destination. This assumes equal time periods for both acceleration and deceleration. I.e., the rotor will accelerate to the midpoint and decelerate to the destination. However, since this idealized situation may not always be present, means must be provided to advance the rotor to the destination should it stop prematurely or overshoot its destination. Finally, once the rotor reaches the destination the motion-producing torque must be terminated and the rotor maintained at rest by suitably energizing the windings to produce a restoring-holding torque in the manner indicated hereinbefore.

*Pulse generator.*—To achieve the above results, i.e., to produce the proper energization of the windings and accomplish high stepping rates, the motor 20 is provided with means for generating stepping pulses which, unlike the prior art pulse generators, produces pulses ideally matched to the torque requirements of the motor permitting maximum utilization of available torque. Specifically, a preferred embodiment of the pulse generating means comprises an apertured disc generally indicated by the numeral 50, which is shown in FIG. 1. The disc is preferably mounted on the rotor shaft for rotation therewith. In FIG. 1, this connection is indicated by a dotted-line connecting the disc 50 and the rotor 34. The disc has two different sets of apertures, an inner and an outer set, which are located at different radii.

The outer set is provided to produce signals which, when acted upon by the control circuit to be described hereinafter, facilitate the reversal of rotor torque so as to bring the rotor to a stop at the desired destination. This set contains 20 apertures, one aperture for each stable rotor position, equally spaced about the rotor periphery. Cooperating with the outer set of apertures is a pair of photosensitive devices $P_1$ and $P_2$. The photosensitive devices $P_1$ and $P_2$ are actually located at a radial distance equal to that of the outer set of apertures, but for the sake of clarity have been shown beyond the disc periphery. Also cooperating with the outer set of apertures, and hence, with the photosensitive devices $P_1$ and $P_2$ are a pair of light sources (not shown). The two light sources are positioned opposite the photosensitive devices $P_1$ and $P_2$ with the disc 50 spaced therebetween. As the disc 50 rotates with the rotor 34, the light beams reaching the respective photosensitive devices will be periodically interrupted by the blank portions of the disc located between adjacent apertures.

Referring again to the apertured disc 50 depicted in FIG. 1, it will be observed that the photosensitive devices $P_1$ and $P_2$ are spaced a distance equal to one-half the arcuate spacing of the apertures in the outer set. Thus, as the disc 50 rotates, a separate pulse train will be produced by each of the photosensitive devices $P_1$ and $P_2$, but the timing of the pulses will be such that they are out of phase with each other. I.e., the pulses from one photosensitive device occur intermediate the pulses from the other photosensitive device. Combining both trains of pulses provides a pulse train having a repetition rate twice that of either train taken alone.

It will also be observed that the disc 50, in the position shown in FIG. 1, has an aperture A–1 positioned directly opposite the photosensitive device $P_1$. From the previous discussion it was indicated that the rotor position shown in FIG. 1 is one of the 20 stable positions of the motor 20. Since the disc 50 is connected to the rotor 34, the disc position shown in FIG. 1 is also stable. Thus, it is seen that a pulse is produced by photosensitive device $P_1$ when the rotor is in one of the 20 stable positions. And, since photosensitive device $P_2$ is located one-half the distance between two apertures, i.e., one-half the distance between two stable rotor positions, a pulse will be produced by photosensitive device $P_2$ when the rotor is midway between two stable positions. For the purpose of clarity, the apertures have been designated with a combined numeral and letter designation. The designation indicates the rotor pole positions relative to the effective poles for the 20 different stable states. For example, when rotor pole 1 is aligned with effective pole A, aperture A–1 is aligned with reference arrow 51 (and with photosensitive device $P_1$). Likewise when rotor pole 4 is aligned with effective pole C, aperture C–4 is aligned with reference arrow 51 (and with the photosensitive device $P_1$).

Referring again to the disc 50 shown in FIG. 1, it will be observed that an inner set of five apertures 60, 62, 64, 66, 68 is provided. This group of apertures is provided to produce signals, which, when acted upon by the control circuit in a manner to be described hereinafter, are applied to the windings to produce either acceleration, deceleration, or restoring-holding torques. The apertures 60, 62, 64, 66, 68 are equally spaced about the disc 50. The arcuate distance between apertures 60, 62, 64, 66, 68 equals the arcuate length of the apertures themselves. Cooperating with this inner set of apertures 60, 62, 64, 66, 68 are two photosensitive devices $P_3$ and $P_4$. These photosensitive devices $P_3$ and $P_4$ are positioned opposite the set of apertures 60, 62, 64, 66, 68 although shown for convenience slightly displaced radially therefrom. Also cooperating with the set of apertures 60, 62, 64, 66, 68 is a pair of light sources (not shown) positioned, one source per photosensitive device, opposite photosensitive devices $P_3$ and $P_4$ with the disc interposed therebetween. The photosensitive devices $P_3$ and $P_4$ are spaced so as to subtend an angle of 18 mechanical degrees, the angle being equivalent to one increment or step of the rotor-disc combination. For reasons to become evident hereinafter, the photosensitive devices $P_3$ and $P_4$ are spaced, when the disc 50 and rotor 34 are in the stable position shown in FIG. 1, centrally within aperture 60 and along radii passing through apertures A–1 and D–5, respectively. Since the total of the angles subtended by the apertures 60, 62, 64, 66, 68 equals the total of the angles subtended by the spaces between these apertures, each of the photosensitive devices $P_3$ and $P_4$ is energized 50 percent of the time providing, of course, the rotor is not at rest. Specifically, as the disc 50 and rotor 34 rotate, each of the photosensitive devices $P_3$ and $P_4$ will alternately be energized for periods of time equal to the length of time it takes the disc to rotate through an angle of 36° which is the equivalent of 180 electrical degrees. However, these periods of energization and de-energization will not be coincident, but will be separated by an amount of time equal to the time it takes for the disc 50 to rotate 18 mechanical degrees which is the equivalent of 90 electrical degrees.

Referring to FIG. 1, particularly to disc 50, and remembering from an earlier discussion that the rotation of the rotor and disc combination from stable position A–1 to stable position B–2 involves 90 electrical degrees or 18 mechanical degrees, it will be clear that 360 electrical degrees equals 72 mechanical degrees of disc-rotor rotation. Now looking at the relationship of the apertures 60, 62, 64, 66, 68 to the spaced devices $P_3$ and $P_4$, it will become apparent that the state of one of the devices will be changing every 18° of disc rotation. The alternating change in state of the devices $P_3$ and $P_4$ generates pulses the duration and repetition rate of which vary as functions of rotor velocity. It is these pulses which, with the aid of the control circuit of FIG. 3 to be described presently, selectively energize the motor windings to produce acceleration, deceleration, or restoring-holding torque. It is also these pulses which produce acceleration regardless of the inertia of the load providing, of course, that the specifications of the motor are not exceeded. While layer inertia produces slower acceleration, the rotor will always accelerate because the application of pulses to the windings is dependent on rotor position and a properly phased pulse is applied to the windings and continues to be applied until the rotor has in fact accelerated to the next position whereupon switching results.

*Control circuit.*—Now referring to FIG. 3, a control circuit is depicted. The control circuit basically comprises five different sections indicated generally by the numerals 32, 70, 72, 74 and 76. These sections cooperate in processing the signals generated by both sets of apertures to alternatively produce acceleration torque, deceleration torque, or restoring-holding torque in the motor 20 in proper time relationship thereby facilitating the accurate stepping of the rotor to a destination.

Referring again to FIG. 3, specifically to the accelerate-decelerate section 32, it is observed that means are provided to process the signals produced by the inner set of apertures 60, 62, 64, 66, 68. The means comprise the photosensitive devices $P_3$ and $P_4$, which in combination with a suitable power supply and amplifying means (not shown), cause current to flow in lines 78 and 80, respectively, whenever any of the apertures 60, 62, 64, 66, 68 are positioned so as to allow light to be incident on the photosensitive devices. Adapted to receive both of the signals on lines 78 and 80 are pairs of AND gates 82 and 84 which are alternatively enabled by complementary signals on lines 86 and 88, respectively. Depending on whether AND gate pair 82 or 84 is enabled, clockwise rotation producing torque or counterclockwise rotation producing torque will be produced, respectively, for reasons to become evident hereinafter. The outputs of AND gate pairs 82 and 84 are fed on lines 90 and 92, and lines 94 and 96, respectively, to AND gates 98 and 100, and inverters 102 and 104, respectively. AND gates 98 and 100 are enabled by one of the complementary outputs of a FLIP-FLOP 106 appearing on line 108. These gates 98 and 100 are conditioned as a result of applying a start pulse the FLIP-FLOP 106 on line 110. When the gates 98 and 100 are enabled, i.e., when rotation is desired, the signals generated by the photosensitive devices $P_3$ and $P_4$, which were passed by either gate pair 82 or 84 depending on the direction of rotation desired, are fed to the windings I–IV. Specifically, if clockwise rotation is desired, the signals from devices 3 and 4 on lines 78 and 80 are passed by AND gate pair 82, AND gate pair 82 being conditioned by an input on line 86, and appear on output lines 90 and 92 which are connected to gates 98 and 100, respectively. Each of these latter two gates 98 and 100, having been conditioned by FLIP-FLOP 106 in response to a start pulse on line 110, will pass the inputs thereto on lines 90 and 92. The output of gate 98 is fed directly to winding I in addition to it being inverted by inverter 112 and the inverted signal fed to winding II. The output of gate 100 is likewise split, one portion going directly to winding III and the other being inverted by inverter 114 and then the inverted signal fed to winding IV. Summarizing, if clockwise motion is desired, the signal from photosensitive device $P_3$ on line 78 is ultimately fed to winding I and an inverted version thereof fed to winding II; and the signal from photosensitive device $P_4$ on line 80 is fed to winding III and an inverted version thereof fed to winding IV. However, if counterclockwise rotation is desired, the relationship between the signals on lines 78 and 80 and that which appears at the windings I–IV is just a reversal of what existed for the clockwise rotation condition. This results because the gate pair 84 is now enabled feeding the signal on lines 78 and 80 first to inverters 102 and 104 and then to gates 98 and 100. Since gate pair 82 is disabled during counterclockwise torque, no signals appear on lines 90 and 92. It is to be made clear at this point that when a positive signal is inverted and fed to the windings no current flows in the windings. When no signal, i.e., a zero signal, is produced by a photosensitive device, this absence of a signal when constituting the input to an inverter, results in a positive signal being produced by the inverter. Summarizing, a positive input signal to an inverter produces no output therefrom, and a zero signal input to an inverter produces a positive output.

From the preceding discussion of the accelerate-decelerate section 32 of the control circuit it is seen that signals produced by the photosensitive devices $P_3$ and $P_4$ are gated to the windings via either of two paths, the particular path depending on whether clockwise or counterclockwise rotation is desired. It was also seen that the signals on lines 86 and 88, by alternatively enabling gate pairs 82 and 84 dictated the path chosen, and hence, the direction of rotation. To alternatively enable gate pairs 82 and 84 a three input FLIP-FLOP 116 is provided. The FLIP-FLOP 116 is designed such that an input on line 118 always produces an output on line 86, an input on line 120 always produces an output on line 88, and an input on line 122 always switches the state of the device to produce an output on either 86 or 88 depending on the state it was in prior to the input. The device 116 may be a conventional bistable circuit modified, if, for example, it is a vacuum tube device, to have the input on line 122 fed to both grid electrodes so that a signal on line 122 will always change the state of the circuit from one stable state to the other. The inputs 118 and 120, of course, are connected, one per grid electrode, to the triodes comprising the bistable device. The signals on lines 118 and 120, which set the FLIP-FLOP 116 in either of the two stable states to produce clockwise and counterclockwise rotation, respectively, can be supplied by any convenient external source.

Once the direction of rotation is selected and one of the lines 118 or 120 is energized to set the FLIP-FLOP 116, the subsequent provision of a start pulse on line 110, by setting the FLIP-FLOP 106, enables gates 98 and 100 to passing signals from photosensitive devices $P_3$ and $P_4$ to the windings I–IV resulting in rotation of the rotor. To enable the rotor to be stepped a specific number of steps to a destination, it is necessary, as was indicated earlier, to provide means to produce acceleration torque, deceleration torque, and a restoring-holding torque once the destination is reached as well as means to indicate when these different torque conditions are to be produced. In the preferred embodiment, these means comprise the rotor hold section 70, the midpoint detector 72, and the destination detector 74.

The midpoint detector 72, as its name indicates, detects the midpoint between the starting point and the destination and in response thereto generates a pulse which is fed to switch the state of FLIP-FLOP 116 changing the torque from acceleration to deceleration. Now referring to the midpoint detector 72, it is seen that it comprises counter 124 having input thereto the signals generated by photosensitive devices $P_1$ and $P_2$. As will be remembered, device $P_1$ produces a pulse corresponding to each stable rotor position while device $P_2$ produces a pulse corresponding to the points intermediate stable rotor positions. Hence, these two devices $P_1$ and $P_2$ together produce two pulses per rotor position or step. Since the outputs of devices $P_1$ and $P_2$ are both fed to the counter 124, the count therein is always equal to twice the number of steps through which the counter has already advanced. Also comprising the midpoint detector 72 is a compare circuit 126 and a single pulse generator 128. Together the counter 124, compare circuit 126, and single pulse generator 128 cooperate with a register 131 to generate a signal on line 130 when the rotor reaches the midpoint of its travel to a destination in a manner to now be described. The number of steps corresponding to that required to advance the rotor to a destination is entered in the register 131. For example, assume 11 steps are desired. Then the number 11 is entered into the register 131. When the rotor advances 5½ steps, the counter 124 has reached a count of 11 and the compare circuit 126 responds to the identity of count in counter 124 and register 131 by producing an input to the single pulse generator 128. The single pulse generator then switches the FLIP-FLOP 116 reversing the torque in the motor in a manner described earlier.

The midpoint of travel having been reached in the illustration given in the preceding paragraph and the acceleration torque switched to a deceleration torque, the rotor begins to slow down. However, as indicated previously, unless the deceleration torque is switched in a restoring-holding torque when the rotor reaches the destination, the rotor will come to rest momentarily at the destination (assuming acceleration time equals deceleration time) and then reverse direction and start accelerating toward the starting point. To switch the deceleration torque to a restoring-holding torque at the destination, the destination detector 74 is provided. The destination detector 74 comprises, like the midpoint detector 72, a counter 132, a compare circuit 134, and a single pulse generator 136, which cooperate with the register 131 to produce a pulse on line 137. The pulse on line 137 is fed to the rotor hold section 70 and in a manner to be described hereinafter changes the deceleration torque to a restoring-holding torque. It will be remembered that the deceleration torque was applied when the rotor reached the midpoint of travel. The manner in which the destination detector operates will be outlined presently. It will be remembered that photosensitive device $P_1$ produces a pulse corresponding to each stable rotor position. These pulses it will be seen are fed to the counter 132. When, in the example given above, the rotor advances 11 steps, i.e., arrives at the destination, the count in counter 132 is the same as that in the register 131. The compare circuit 134 responds to this identity of count by producing an input to the single pulse generator 136 which, as stated previously, serves to produce a restoring-holding torque by resetting the FLIP-FLOP 106. Thus, the rotor is maintained at rest at its destination by the restoring-holding torque.

To produce a restoring-holding torque and thereby enable the rotor to be maintained at rest at the destination, a rotor hold section 70 is provided. The rotor hold section 70 comprises FLIP-FLOP 106 and AND gates 140 and 142. From the previous discussion of the accelerate-decelerate section 32 it was seen that one output of the FLIP-FLOP 106, namely the output on line 108, when present in response to a start pulse on line 110, served to enable gates 98 and 100. These gates, when enabled, passed signals to the windings in such a manner as to produce either clockwise or counterclockwise torque, the particular direction depending on the state of FLIP-FLOP 116. Now, looking again to the FLIP-FLOP 106, it is observed that the pulse produced by the destination detector 74 on line 134 resets the FLIP-FLOP 106 disabling gates 98 and 100 and enabling gates 140 and 142. The net result is that the signals from photosensitive devices $P_3$ and $P_4$ are passed, with modification, to the windings I–IV by gates 140 and 142, respectively, producing a restoring-holding torque. The modification involves an inversion of the signal on line 78 by inverter 144. As will be seen hereafter, the signals on lines 78 and 80 produce clockwise torque if gated directly to the windings by gates 98 and 100, produce a counterclockwise torque if both are inverted by inverters 102 and 104 and then gated to the windings by gates 98 and 100, and produce a holding-restoring torque if only one of the signals is inverted by inverter 144 and then gated to the windings by gates 140 and 142.

The sections of the control circuit depicted in FIG. 3, which have been described thus far, have assumed a mode of operation wherein a destination is reached by accelerating the rotor to the midpoint of the desired rotor travel, and then decelerating for an equal number of steps to the destination. However, it is possible in some applications that the friction or load will be of such a nature that deceleration of the rotor for a period corresponding to less than the number of steps remaining between the midpoint and the destination will be sufficient to cause the rotor to reach zero velocity. For example, assume an 11 step increment is desired. It was seen that ideally this can be produced by accelerating for 5½ steps and decelerating for 5½ steps. However, it is possible that due to friction and loading factors the rotor will reach zero velocity before it reaches the destination, e.g., after it has decelerated 3½ steps. Thus, it will be necessary, in this case, to provide means to advance the rotor the remaining 2 steps to the destination.

To correct errors associated with the kind of rotor undershoot described above, undershoot section 76 may be incorporated into the control circuit if desired. This section comprises a pulse length monitor 150 which receives pulses from the photosensitive device $P_1$ at the rate of one per step. When the pulse length exceeds a certain length, the motor is assumed to have stopped momentarily. The pulse length monitor 150 then causes the single pulse generator 152 to feed a pulse to AND gate 154. The AND gate 154 is conditioned by the output on line 108 from FLIP-FLOP 106. However, due to delay means 156 interposed between the FLIP-FLOP 106 and the gate 154, the gate 154 is conditioned after a delay sufficient to allow the rotor to accelerate from rest. The delay 156 merely serves to disable the pulse length monitor during the period of low velocity which occurs when the rotor first accelerates from rest. Since the first pulse is of rather long duration, the rotor previously having been at rest, an output from the pulse length monitor 150 would be obtained unless the delay 156 were interposed. Assuming a long pulse has been detected by the monitor 150, a pulse generated by pulse generator 152 is gated by AND gate 154 to set a FLIP-FLOP 158. The FLIP-FLOP 158 conditions an AND gate 160 gating the pulse from the photosensitive device $P_1$ to the FLIP-FLOP 116. The FLIP-FLOP 116 then switches the torque from a deceleration torque to an acceleration torque. Thus, the rotor, which had been slowing to a premature stop relative to the destination under a deceleration torque initiated by the midpoint detector, now begins to accelerate to the destination. However, it accelerates only one step because the very next pulse from the photosensitive device $P_1$ will be gated by gate 160 to FLIP-FLOP 116 switching the torque once again to a deceleration torque. The rotor will decelerate one step and then the pulse from device $P_1$ will be gated to the FLIP-FLOP 116 to switch the torque to an acceleration torque. This type of motion, i.e., alternately accelerating for a step and decelerating for a step, continues until the destination is reached whereupon the destination detector, having accumulated the proper count in its counter 132, will generate a pulse which is fed to the FLIP-FLOP 106 to produce a restoring-holding torque and maintain the rotor at rest at the destination.

To facilitate resetting of the counters 124 and 132, reset means 161 are provided which produce a reset pulse whenever the input thereto on line 108 goes positive. This reset pulse is fed to the counters to reset them in a manner well known in the art. The reset means could be, for example, a single pulse generator.

*Operation*

The structure of the preferred embodiment of the invention having been described, a description of the operation thereof will now follow. As an illustration, it will be assumed that the rotor is at rest in the position shown in FIG. 1, and that it is desired to advance the rotor 10 steps in the clockwise direction. Neither the number of steps to be advanced nor the starting position are of any special significance, but are merely chosen for the purpose of illustration.

Now referring to FIG. 1, it is seen that photosensitive devices $P_3$ and $P_4$ are opposite aperture 60 and, therefore, are energized, i.e., current is flowing in lines 78 and 80. Since it is assumed that the rotor is initially at rest, the FLIP-FLOP 106 is reset enabling gates 140 and 142 and disabling gates 98 and 100. It will be remembered that the FLIP-FLOP 106 is reset upon arrival at a destination. In this example, the last destination to be reached is the present initial position, i.e., aperture A–1 located opposite reference arrow 51. With photosensitive devices $P_3$ and P₄ energized and gates 140 and 142 enabled, the signals on lines 78 and 80 are fed to the windings I–IV in a restoring-holding torque mode. Specifically, the signal on line 78 is inverted and the inverted signal fed to winding III resulting in deenergization of that winding. This inverted signal is once again inverted and fed to winding IV resulting in winding IV being energized. The signal on line 80 is fed directly to winding I energizing that winding. It is also inverted and fed to winding II de-energizing winding II. Thus, the net result of initially having the disc 50 in the position shown and with the FLIP-FLOP 116 reset is that only windings I and IV are energized producing a restoring torque. Referring to the motor in FIG. 1, it will be seen that with windings I and IV energized, an effective north pole is created at location A holding rotor 1 in alignment therewith. This condition can also be visualized by referring to the torque plot in FIG. 2, where it will be observed that with windings I and IV energized, the resultant torque curve (I+IV) indicates that a restoring-holding torque is present. I.e., clockwise rotation produces a negative torque tending to return the rotor to the point I, IV. Similarly, counter-clockwise rotation produces a positive torque tending to return the motor to its rest position.

The initial starting condition of the rotor in the example has been described above. The mechanics of producing rotation will now be discussed. To produce clockwise rotation, it is necessary to enable gate pair 82 by pulsing the FLIP-FLOP 116 on line 118. As described earlier, this will allow signals from the photosensitive devices P₃ and P₄ to be gated through gate pair 82 and thence through gates 98 and 100, respectively, to the windings when the start pulse sets the FLIP-FLOP 106. Having determined that clockwise motion is desired and having pulsed the FLIP-FLOP 116 on line 118, a further step is required before an accelerating, clockwise torque can be produced. It is required that the register 131 be loaded indicating the number of steps desired, which in this example, is 10. With the control circuit readied for clockwise, accelerating torque and a 10 step increment, rotor motion can be initiated by supplying a start pulse on line 110 to the FLIP-FLOP 106. This start pulse sets the FLIP-FLOP 106 disabling the gates 140 and 142 that had been gating the signals from the photosensitive devices P₃ and P₄ to the windings in a restoring-holding torque producing mode. The signals from photosensitive devices P₃ and P₄ will now be gated by gate pair 82 to gates 98 and 100 and thence to the windings in a torque producing mode, specifically a clockwise torque producing mode. From the earlier discussion, it will be remembered that the photosensitive devices P₃ and P₄ are energized when aperture A–1 is aligned with the reference arrow 51. Looking at the control circuit in FIG. 3, it will be seen that when the photosensitive devices P₃ and P₄ are energized, signals are fed to the windings producing a clockwise, acceleration torque. Specifically, the signal on line 78 is fed without inversion to winding I and with inversion to winding II resulting in energization of winding I only. The signal on line 80 is fed without inversion to winding III and with inversion to winding IV resulting in energization of winding III only. Referring now to the motor 20 depicted in FIG. 1, it will become apparent that with windings I and III energized an effective pole is produced at location B tending to attract stator pole 2 in a clockwise direction (see torque curve (I+III)).

The rotor 34 continues to rotate under the accelerating torque produced by effective pole B until the midpoint of the space between aperture A–1 and aperture B–2 is aligned with reference arrow 51 at which time photosensitive device P₃ will no longer be energized. When the energization of photosensitive device P₃ ceases, that is, after the disc 50 rotates clockwise 9°, windings I and II switch their states of energization because the signal on line 78, heretofore present, is now absent. Thus, at this point (point 40 on the torque plot) windings II and III are energized. By referring to the motor 20 depicted in FIG. 1, it will be observed that this condition of winding energization produces an effective pole at location C which tends to further accelerate the rotor 34 in the clockwise direction. This state of energization of the windings remains unchanged for the next 18° of clockwise rotation. This can be verified by referring to disc 50 where it will be seen that once the photosensitive device P₃ becomes de-energized no change in the condition of energization of either of the devices P₃ and P₄ occurs until after the disc has rotated an additional 18°.

When the disc 50 has stepped an adidtional 18° for a total of 27° from the starting point, it will be observed, by referring to the disc, that the photosensitive device P₄ ceases to be opposite aperture 60 leaving both of the devices P₃ and P₄ in the de-energized condition. At this point, which corresponds to point 42 on the torque curve, windings II and IV become energized since signals are absent on both lines 78 and 80 producing an effective pole at location D. This last point corresponds to a rotor position wherein the midpoint of the space between apertures B–2 and C–3 is aligned with reference arrow 51. With photosensitive devices P₃ and P₄ de-energized at this point and windings II and IV energized as a result thereof, the disc continues to accelerate in the clockwise direction 18° to a point wherein the reference arrow 51 is aligned with the midpoint of the space between aperture C–3 and D–4. At this point, which corresponds to point 44 on the torque plot, photosensitive device P₃ is opposite aperture 62 and becomes energized resulting in the energization of winding I and de-energization of winding II. The energization state of photosensitive device P₄ has remained unchanged. With windings I and IV energized an effective pole is produced at location A causing further acceleration of the rotor 34.

The disc continues to rotate in the clockwise direction an additional 18° as a result of the torque produced by windings I and IV until the midpoint of the space between apertures A–5 and D–4 is aligned with the arrow 51 whereupon photosensitive device P₄ will be aligned with the aperture 62 resulting in energization of photosensitive device P₄. This point corresponds to point 46 on the torque plot. With both photosensitive devices P₃ and P₄ energized giving signals on lines 78 and 80, windings I and III are energized producing an effective pole at location B which causes further clockwise acceleration. This condition of energization will remain unchanged for the next 18° of rotation until the disc rotates to a point wherein the reference numeral 51 is aligned with the midpoint of the space between apertures A–5 and B–1. At this point, which corresponds to point 40 on the torque plot, photosensitive device P₃ becomes de-energized resulting in energization of winding II. However, the state of energization of winding III remains unchanged because photosensitive device P₄ is still opposite aperture 62. With photosensitive devices P₃ and P₄ de-energized and energized, respectively, and windings II and III energized, an effective pole is produced at location C causing the disc to further accelerate in the clockwise direction. Up to this point the rotor-disc combination has rotated 4½ steps totalling 81°. The energization conditions of the windings have switched 5 times, specifically after 9°, 27°, 45°, 63° and 81° of rotation. These switching points correspond to points 40, 42, 44, 46, 40, respectively, designated on the torque plot shown in FIG. 2.

Thus far the discussion of the operation of the preferred embodiment has focused on the manner in which photosensitive devices P₃ and P₄ cooperating with apertures 60 and 62 have produced a clockwise rotor acceleration torque. It has been seen that the spacing between the photosensitive devices P₃ and P₄ and their relationship to the apertures 60 and 62, in combination with the control circuit logic depicted in FIG. 3, has been able to produce from the signals on lines 78 and 80 a continuous acceleration torque on the rotor in the clockwise direction. In response to this torque, the rotor stepped from position A–1 through positions B–2, B–3, D–4, A–5, to a point midway between apertures A–5 and B–1.

A digression will be made at this point to investigate the behavior of other portions of the preferred embodiment during the period that the rotor has been accelerating. While the discussion now shifts to a discussion of other aspects of the invention and away from the acceleration mechanism, the rotor, it will be understood, having accelerated for 4½ steps, continues to accelerate. The change in focus of the discussion at this point is essential because the rotor having advanced nearly to the midpoint of travel, will soon be decelerated and the manner in which this is brought about is important to an understanding of the invention.

In addition to photosensitive devices $P_3$ and $P_4$ being switched on and off producing acceleration as the disc 50 rotates clockwise, photosensitive devices $P_1$ and $P_2$ coacting with the outer set of apertures have also been changing states in a periodic fashion. Specifically, photosensitive device $P_1$ has been producing pulses as each aperture B–2 through A–5 has passed in alignment with the photosensitive device $P_1$. Thus, as the disc has been accelerating from position A–1 to a point midway between apertures B–1 and A–5, photosensitive device $P_1$ has produced pulses successively at apertures B–2, C–3, B–4, and A–5, at intervals of 18 mechanical degrees, the first pulse being produced by aperture B–2 following an 18° rotation of the disc 50 in the clockwise direction. Referring to the circuit diagram depicted in FIG. 3, the four pulses produced by photosensitive device $P_1$ have been fed to counter 132 in the destination detector 74. Hence, counter 132 has accumulated a count of 4. However, since the register 131 has been loaded to a count of 10 corresponding to the 10 step increment desired, no signal is produced by the compare circuit 134 and, therefore, no pulse has been produced on line 137 by single pulse generator 136 signifying that the rotor 34 has stepped to its destination. Since no output appears on line 137 the FLIP-FLOP 106 is not reset to produce a restoring-holding torque and the rotor continues to accelerate clockwise.

Referring again to the disc 50 depicted in FIG. 1, it will be appreciated that as the rotor and disc have been accelerated clockwise pulses have also been produced by photosensitive device $P_2$ every 18 mechanical degrees starting at the point where aperture B–2 is aligned with photosensitive device $P_2$ and continuing for four additional pulses produced by apertures C–3, D–4, A–5, and B–1.

Taking the pulses produced by both photosensitive devices $P_1$ and $P_2$, it is seen that a total of 9 pulses have been produced corresponding to the 4½ steps the rotor has moved. These 9 pulses have been fed to the midpoint detector 72. However, since 10 steps are desired, a count of 10 in counter 124 is required before a signal is produced by the midpoint detector 72 indicating that the midpoint of travel has been reached. Hence, the rotor continues to accelerate, the torque direction not having been changed.

Now returning to the discussion of the rotor stepping, it will be observed that as the disc, which has already stepped 4½ steps, continues to rotate aperture B–1 passes photosensitive device $P_1$ producing the tenth pulse to be produced by the outer set of apertures. The rotor has now stepped 5 steps, resulting in the production of 10 pulses, 5 pulses each by devices $P_1$ and $P_2$. These pulses have been sent to the counter 124 of the midpoint detector 72 accumulating a count of 10. Since the contents of counter 124 and the register 131 are now equal the compare circuit 126 produces an output which is sent to pulse generator 128. The pulse generator 128 produces a pulse on line 130 which changes the state of the three input FLIP-FLOP 116 disabling gate pair 82 and enabling gate pair 84. From the previous discussion, it will be remembered that gate pair 84 acts in such a manner as to gate the signals from photosensitive devices 78 and 80 to the windings I–IV to produce a torque in a direction opposite to that which exists when gate pair 82 is enabled. Specifically, with gate 84 now enabled as a result of a count of 10 being obtained in counter 124, the signals from the photosensitive devices $P_3$ and $P_4$ on lines 78 and 80 are gated by gate pair 84 to inverters 102 and 104 whereupon the signals are inverted and gated by gates 98 and 100 to the windings I–IV so as to produce a counterclockwise torque tending to slow down the rotor.

Referring to the circuit diagram depicted in FIG. 3, the 5 pulses produced by photosensitive device $P_1$ have been fed to counter 132 in the destination detector 74. Hence, counter 132 has accumulated a count of 5. However, since the register 131 has been loaded to a count of 10 corresponding to the 10 step increment desired, no signal is produced by the compare circuit 134 and, therefore, no pulse has been produced on line 137 by the single pulse generator 136 signifying that the rotor 34 has stepped to its destination. Since no output appears on line 137, the FLIP-FLOP 106 is not reset to produce a restoring-holding torque and the rotor continues to accelerate clockwise.

Summarizing, it has been assumed that a 10 step increment in the clockwise direction was desired and the rotor was initially at rest under the action of a restoring-holding torque in the position shown in FIG. 1. It is seen that to have the pulses produced by photosensitive devices $P_3$ and $P_4$ applied to the windings I–IV in a manner to produce clockwise torque, it is necessary to pulse line 118 thereby setting FLIP-FLOP 116 in such a manner that gate pair 82 is enabled. It is also seen that the register 131 is loaded with a count of 10 corresponding to the increment desired. With register 131 loaded and gate pair 82 enabled to produce clockwise torque, and hence, clockwise acceleration, it is only necessary to pulse line 110 to set the FLIP-FLOP 106. This then feeds the signals on lines 78 and 80 without inversion by inverters 102 and 104 through gates 98 and 100 to the windings I–IV. Finally, it is seen that as the disc and rotor are accelerated in the clockwise direction under the action of the signals produced by photosensitive devices $P_3$ and $P_4$, a total of 10 pulses is produced by photosensitive devices $P_1$ and $P_2$ as a result of apertures A–1, B–2, C–3, D–4, A–5, and B–1 passing photosensitive devices $P_2$ and $P_1$. These 10 pulses, as a result of being fed to counter 124 in the midpoint detector 72, cause a compare signal to be produced by the compare circuit 126 which ultimately causes a pulse to be produced on line 130 to switch the state of the FLIP-FLOP 116 disabling gate pair 82 and enabling gate pair 84. The net result is that the signals generated by photosensitive devices $P_3$ and $P_4$ are now passed through inverters 102 and 104 prior to being gated to the windings I–IV resulting in a counterclockwise torque being produced which tends to decelerate the rotor 34 following the fifth step.

The description thus far has concerned the acceleration of the rotor in a clockwise direction from a rest position wherein aperture A–1 is aligned with reference arrow 51 through 5 steps to a point wherein aperture B–1 is aligned with the reference arrow. The discussion has also indicated the manner in which the torque is changed from a clockwise acceleration torque to a counterclockwise deceleration torque as a consequence of the rotor having stepped clockwise 5 steps to the midpoint of travel. The discussion will now focus on the manner in which photosensitive devices $P_3$ and $P_4$ cooperate with the inner set of apertures to produce a counterclockwise deceleration torque and how, when the disc has decelerated for 5 steps, the destination detector 74 produces a signal to switch the deceleration torque to a holding-restoring torque to maintain the rotor at rest at the destination.

When the disc has advanced to the midpoint of travel, that is, when aperture B–1 is aligned with the reference arrow 51 it will be observed that photosensitive device $P_3$ is de-energized while photosensitive device $P_4$ is energized. Since AND gate pair 84 is enabled, the signals on lines 78 and 80 from the photosensitive devices $P_3$ and $P_4$ are gated through inverters 102 and 104 prior to being gated to the windings I–IV. The net result is that the de-energization of photosensitive device $P_3$ produces energization of winding I and deenergization of winding II. The energization of photosensitive device $P_4$ produces de-energization of winding III and energization of winding IV. With windings I and IV energized an effective pole is produced at location A. Referring to the motor 20 in FIG. 1, it will be observed that when aperture B–1 is aligned with arrow 51 rotor pole 1 is aligned with effective pole location B. Thus, it can be seen that with windings I and IV energized yielding an effective pole at A, rotor pole 5 will be attracted toward effective pole A tending to produce a counterclockwise torque on the rotor 34. However, since the rotor 34 has some finite velocity as a result of accelerating through 5 steps, the torque produced on the rotor as a result of having an effective pole at A is not effective to produce counterclockwise rotation of the rotor, but rather is only effective to cause the rotor to decelerate. The above-noted condition of winding energization, that is, windings I and IV energized will continue for another 9 mechanical degrees of rotation whereupon photosensitive device $P_4$ becomes de-energized as the midpoint of the space between apertures B–1 and C–2 becomes aligned with the arrow 51. This condition of de-energization of photosensitive devices $P_3$ and $P_4$, which results in energization of windings I and III, will persist for the next 18 degrees of mechanical rotation. Referring to the motor 20, it will be observed that with windings I and III energized an effective pole is created at location B tending to rotate the rotor counterclockwise. Deceleration torque will continue to be produced during the remaining steps by successive energizations and deenergizations of the photosensitive devices $P_3$ and $P_4$ as the disc 50 rotates clockwise to the destination. When aperture C–1 finally moves to a point in alignment with the arrow 51 marking the end of travel a pulse is produced by photosensitive device $P_1$. This pulse, like other pulses produced by the outer set of apertures, is fed to the counter 132 in the destination detector. However, since aperture C–1 is the 10th aperture to successively energize photosensitive device $P_1$, and since only 10 steps were desired, this particular pulse produces in counter 132 a count identical to that in the register 131. In response to this identity of count a signal is produced by the compare circuit 134 reflecting the fact that the destination has been reached. The output of the compare circuit 134 is then fed into a single pulse generator 136, which in turn produces a pulse which resets the FLIP-FLOP 106. As indicated earlier, the resetting of the FLIP-FLOP 106 produces a restoring-holding torque tending to maintain the rotor in its present position. In this case its present position is such that aperture C–1 is in alignment with the reference arrow 51.

Summarizing, in the foregoing example, it was assumed that the rotor was at rest in the position shown in FIG. 1 and that it was desired to step the rotor a total increment of 10 steps in the clockwise direction. In this rest position photosensitive devices $P_3$ and $P_4$ are both energized and the signals produced thereby when gated to the windings through gates 140 and 142 result in the energization of windings I and IV. With the rotor in the rest position and windings I and IV energized a restoring-holding torque is produced.

To effect the desired rotation in the example given hereinbefore, register 131 is loaded with a count of 10 corresponding to the number of steps in the desired increment and line 118 is pulsed to enable gate pair 82 so that subsequent pulsing of line 110 setting FLIP-FLOP 106 will gate the pulses from the photosensitive devices $P_3$ and $P_4$ to the windings in such a manner as to produce a clockwise torque on the rotor. The rotor then accelerates for 5 steps to a point where aperture B–1 is aligned with the arrow 51 before the midpoint detector 72 produces a signal which changes the state of FLIP-FLOP 116 thereby disabling gate pair 82 and enabling gate pair 84. The net result is that the pulses generated by the continued rotation of the disc 50 in the clockwise direction are now inverted before being passed to the windings I–IV thereby producing counterclockwise torque. The rotor continues to slow down under the action of the decelerating torque and eventually comes to rest at the destination (aperture C–1 aligned with arrow 51) whereupon the destination detector 74 produces a pulse which resets the FLIP-FLOP 106 causing the signals from photosensitive devices $P_3$ and $P_4$ to be applied to the windings in a restoring torque mode.

In the above example, it has been assumed that the rotor would not come to rest prior to reaching the destination. However, as indicated in the earlier discussion, loading and friction factors may cause the rotor to come to rest prematurely. To advance the rotor to the destination and thereby avoid having the rotor come to rest prematurely, the undershoot section 76 is provided. This section, it will be remembered, monitors the pulses generated by photosensitive device 1 and when the pulse length reaches a certain specified length it assumes the rotor had come to rest and generates a pulse to switch FLIP-FLOP 116 thereby producing an aceleration torque. This acceleration torque continues for 1 step whereupon the next pulse from the photosensitive device $P_1$ is gated through gate 160 once again changing the state of FLIP-FLOP 116 causing a deceleration torque to be produced. This deceleration torque, like the previous acceleration torque, continues for 1 step whereupon the succeeding pulse from photosensitive device $P_1$ is gated through gate 160 to again switch the FLIP-FLOP 116. Thus, the rotor is advanced to the destination under the action of alternating acceleration and deceleration torques whereupon the destination detector generates a pulse to reset the FLIP-FLOP 106 to produce a restoring-holding torque and maintain the rotor at rest at the destination.

In the example now to be given illustrating the operation of the undershoot section 76, assume a 10 step increment is desired and that the rotor has accelerated for 5 steps whereupon the midpoint detector 72 generated a pulse to switch the state of FLIP-FLOP 116 causing a deceleration torque to be produced. Now assume further that the velocity of the rotor has slowed down sufficiently so that the width of the pulse produced as a result of aperture A–4 passing the photosensitive device $P_1$ is great enough to actuate the pulse length monitor 150. It will be remembered that if the length of a pulse from photosensitive device $P_1$ exceeds a specified maximum, the pulse length monitor 150 will be actuated resulting in the FLIP-FLOP 116 being switched. Now assuming that the undershoot section 76 has been actuated, the FLIP-FLOP 116 will be switched so that the signals on lines 78 and 80 will now be fed to the windings I–IV so as to produce an acceleration torque. This acceleration torque will continue for 1 step at which time aperture B–5 produces a pulse as it moves past photosensitive device $P_1$. This pulse is gated through gate 160 switching the state of the FLIP-FLOP 116 which results in the production of a deceleration torque. The deceleration torque continues until aperture C–1 passes in alignment with photosensitive device $P_1$ whereupon the 10th pulse is fed to the destination detector which signals that a total travel of 10 steps has been accomplished and ultimately resets the FLIP-FLOP 106 producing a holding-restoring torque. Thus, it is seen that the undershoot section will, when the rotor slows down prematurely, produce alternate steps of acceleration and deceleration advancing the rotor to the destination. When the destination is reached the destination detector performs its function of producing a holding-restoring torque.

A possible variation of the above operation of the undershoot section 76 might be desirable if excessive vibrations result from switching to a restoring-holding torque mode after the rotor has accelerated for an entire step. In the above example when the rotor stopped two steps prematurely, it was accelerated for a step and decelerated for a step until the destination was reached. It will be observed that in the above case since the rotor had been decelerating for a step prior to reaching the destination, the rotor had substantially zero velocity when the restoring-holding torque was applied. Hence, little vibration would result. However, if the rotor comes prematurely to a stop, an odd multiple of steps from the destination, switching to the restoring-holding torque would occur following an accelerating step. And, as indicated, this could result in undesired vibrations if the velocity of the rotor is too large. To obviate this problem, the alternate periods of acceleration and deceleration following a premature stop could be of half-step duration rather than full step duration. Thus, the maximum rotor velocity after an acceleration period would be less than if it had accelerated for a full step. To accomplish such a result, it is only necessary to feed the pulses from device $P_2$ to the gate 160 in addition to the pulses from device $P_1$ which were already being fed to gate 160. With pulses from both devices $P_1$ and $P_2$ being fed to gate 160, the FLIP-FLOP 116 will be switched every half-step instead of every step as in the example given previously. Hence, the rotor after prematurely stopping will be alternately accelerated for half of a step and decelerated for half of a step until the destination is reached.

In the examples heretofore given, it was desired to step the rotor 10 steps in the clockwise direction. As has been stated previously both the direction of rotation and the number of steps comprising the increment were arbitrarily chosen for the purposes of illustration and could be subject to variation. For example, if counterclockwise rotation is desired, line 120 would be pulsed prior to the initiation of the start pulse rather than line 118. If it is desired to vary the number of steps comprising the increment, it is only necessary to load the register 131 with a different number corresponding to the number of steps desired.

As those skilled in the art will appreciate, numerous variations and changes may be made without departing from the spirit and scope of the invention. For example, the preferred embodiment has been shown utilizing a bifilar wound motor having four stator poles and five rotor poles. Both the type and number of stator windings as well as the number of rotor poles might be varied depending on the particular application desired. Bifilar windings are preferred because they permit the application of pulses to the windings in torque producing modes without the need for complicated switching circuitry. The invention is not to be considered as limited to the use of bifilar wound motors. On the contrary, any motor capable of stepping action in response to pulses may be adapted for use in this invention, and hence, would constitute a stepping motor for the purposes herein. Additionally, the preferred embodiment of the invention has been shown to have 20 stable positions. There is nothing critical in the number of stable positions used, the number merely being dependent on the particular application involved and on the number of stator and rotor poles.

As will be understood by those skilled in the art, overshoot circuitry similar to that represented by the undershoot section 76 may be provided if, because of application parameters, it is found that the rotor has a tendency to overshoot the destination rather than undershoot. If overshoot tends to occur and it is not desired to provide the additional circuitry similar to that of section 76 to return the rotor to the destination, it may be desired to provide permanent rotor damping or breaking so that the possibility of overshoot is eliminated.

Additionally, while the control circuit described herein has been designed for use in applications where the destination is reached prior to the rotor accelerating to its maximum velocity, i.e., for travel paths of short enough length that the rotor does not reach maximum velocity in its travel to the midpoint, it will be understood by those skilled in the art that the application of this invention is not limited to only this case. If, for example, it is desired to step the motor some arbitrarily large number of steps, e.g., 40,000 steps, the maximum velocity of the rotor being reached after perhaps 50 revolutions, means may be provided for disabling the midpoint detector and causing the torque to switch from the acceleration mode to the deceleration mode at a point which is short of the destination by a specific, predetermined number of steps. The predetermined number of steps would be just sufficient to slow down the motor from maximum velocity and bring it to a stop at the destination. Assuming that the rotor can decelerate from maximum velocity to zero velocity in 1,000 steps, then if 40,000 steps are desired, a counter set to 3,985 could be compared with the register 131 and a pulse produced when the counter and register 131 have similar counts. The pulse would serve to switch the torque to the deceleration mode. The switch would occur when the rotor stepped 39,000 steps leaving the required 1,000 steps for decelerating the rotor to a stop at the 40,000th step.

It is also to be understood by those skilled in the art that the pulse generation means which has been disclosed for producing pulses, the duration and repetition rate of which are functions of the rotor velocity, need not be an apertured disc in combination with light sources and photosensitive devices. The pulse generation means may be any means which produce pulses the duration and repetition rate of which are functions of the rotor velocity and may, for example, comprise a read head in combination with a magnetic drum having sensible indicia spaced about its periphery at preselected points. Nor need the pulse generating means be mounted directly on the rotor shaft for movement coaxial therewith, but may be any means whatsoever which are capable of producing pulses which vary as herein described.

It is also to be understood that it is not imperative that the pulse generating means generate merely one pulse per step. The number of pulses per step may be other than one pulse per step and will be dependent on the winding, stator, and rotor arrangement utilized. The one pulse per step scheme utilized herein is only one of many possibilities.

It is to be further understood that the rotor may be maintained at rest by other suitable means in addition to the restoring-holding torque scheme of the preferred embodiment. For example, the rotor could be maintained at rest by de-energization of all the windings providing the friction torque is sufficient to prevent spurious movement once the rotor has come to rest. Or the rotor might be maintained at rest by mechanical brake means actuated when the rotor reaches the destination and deactuated when the rotor accelerates.

Finally, the switching of the windings for production of acceleration and deceleration has been described herein with respect to the preferred embodiment as occurring at points 40, 42, 44 and 46 shown on the torque plots depicted in FIG. 2. However, as will be evident to one skilled in the art, the switching need not occur at these preferred points but may occur either earlier or later. The preferred points have been selected because they permit maximum utilization of the available torque.

While the invention has been particularly shown and described with reference to a preferred embodiment thereof, it will be understood by those skilled in the art that the foregoing and other changes in form and details may be made therein without departing from the spirit and scope of the invention.

We claim:

1. In a stepping motor which includes windings and a movable rotor, the combination comprising:
   means for generating pulses the time of generation, repetition rate and duration of which are functions of the angular position and rotational velocity of said rotor; and control means including pulse application means interposed between said pulse generating means and said windings for selectively applying said pulses to said windings to step said rotor a controllable number of steps to a destination, said control means including means for causing said pulses to be applied by said pulse application means to said windings for producing rotor accelerating torque during a first fraction of said steps and rotor deceleration torque during a second fraction of said steps.

2. In a stepping motor which includes windings and a movable rotor, the combination comprising:

means for generating pulses the repetition rate and duration of which are functions of the rotational velocity of said rotor; and control means including pulse application means interposed between said pulse generating means and said windings for selectively applying said pulses to said windings to step said rotor a controllable number of steps to a destination, said control means having additional means for causing said pulses to be applied to said windings by said pulse application means for producing rotor acceleration torque during the first half of said steps and rotor deceleration torque during the second half of said steps, said control means further including means for energizing said windings to produce a restoring-holding torque tending to maintain said rotor at rest at said destination.

3. In a stepping motor which includes windings and a movable rotor, the combination comprising:

means for generating pulses the repetition rate and duration of which are functions of the rotational velocity of said rotor;

control means including pulse application means interposed between said pulse generating means and said windings for selectively applying said pulses to said windings to step said rotor a controllable number of steps to a destination, said control means having additional means for causing said pulses to be applied to said windings by said pulse application means for producing rotor acceleration torque during a first portion of travel of said rotor, rotor deceleration torque thereafter until said rotor comes to rest, and thereafter alternately rotor acceleration torque and rotor deceleration torque until said rotor arrives at said destination; and means for maintaining said rotor at rest, said means being selectively operable.

4. A stepping motor having a plurality of first (I, II) and second (III, IV) windings and a rotor wherein the sequential non-inverted energization of said windings steps the rotor comprising:

first ($P_3$) and second ($P_4$) pulse generation means, actuated by rotation of said rotor, for generating sequentially inverted and non-inverted pulses wherein the time of generation, repetition rate, and duration of said pulses are functions of the angular position and rotational velocity of said rotor, first gating means (82) for gating first pulses from said first pulse generation means directly to one (I) of said first windings and through an inverter (112) to another (II) of said first windings, and for gating second pulses from said second pulse generation means directly to one (III) of said second windings and through another inverter (114) to another (IV) of said second windings, whereby said first and second pulses sequentially energize said windings and cause a stepping rotation of the rotor.

5. The apparatus of claim 4 further including, second gating means (84) connecting, upon energization, said first and second pulse generation means through third (102) and fourth (104) inverters to said windings, respectively, switch means (116) for selectively energizing said first gate means to produce a torque tending to cause rotor rotation in one direction and said second gate means to produce a torque tending to cause rotor rotation in the opposite direction.

6. The apparatus of claim 5 further having, a destination detector (74), including first sensing means ($P_1$) actuated once for each step by rotation of said rotor, for detecting when the rotor has been stepped to a predetermined destination, a point detector (72) including a counter (124) actuated once for each step by said first sensing means, including means for actuating said counter counts in addition to the actuation for each step, and including compare means (126) for detecting when said counter equals said predetermined count and for thereafter switching said switch means (116) to reverse the torque and thereby decelerate the rotor.

7. The apparatus of claim 6 further having an undershoot circuit means (76), including a pulse length monitor (150) connected to said first sensing means ($P_1$), for stepping said rotor to the predetermined destination when the time interval between steps exceeds a predetermined amount.

References Cited
UNITED STATES PATENTS

| | | | |
|---|---|---|---|
| 3,204,165 | 8/1965 | Kreutzer | 318—138 |
| 3,241,023 | 3/1966 | Eby | 318—341 X |
| 3,257,595 | 6/1966 | Polakowski | 318—341 X |
| 3,258,669 | 6/1966 | Krassoievitch | 318—341 X |
| 3,268,789 | 8/1966 | Pintell | 318—341 X |
| 3,271,649 | 9/1966 | Juergensen | 318—138 X |
| 3,293,459 | 12/1966 | Kreuter et al. | 318—436 X |

ORIS L. RADER, *Primary Examiner.*

BENJAMIN DOBECK, *Examiner.*

G. SIMMONS, *Assistant Examiner.*